United States Patent
Junk et al.

(10) Patent No.: US 12,139,629 B2
(45) Date of Patent: Nov. 12, 2024

(54) GAS PERMEABLE WINDOWS COMPOSED OF AMORPHOUS CROSSLINKED FLUORINATED COPOLYMERS AND METHODS OF MAKING AND USING THEREOF

(71) Applicant: Chromis Fiberoptics, Inc., Warren, NJ (US)

(72) Inventors: Christopher P. Junk, Wilmington, DE (US); Whitney Ryan White, Watchung, NJ (US)

(73) Assignee: Chromis Fiberoptics, Inc, Warren, NJ (US)

( * ) Notice: Subject to any disclaimer, the term of this patent is extended or adjusted under 35 U.S.C. 154(b) by 778 days.

(21) Appl. No.: 17/228,153

(22) Filed: Apr. 12, 2021

(65) Prior Publication Data

US 2021/0317329 A1   Oct. 14, 2021

Related U.S. Application Data

(60) Provisional application No. 63/009,117, filed on Apr. 13, 2020, provisional application No. 63/009,112, filed on Apr. 13, 2020.

(51) Int. Cl.
| | |
|---|---|
| *C09D 127/12* | (2006.01) |
| *B29C 64/124* | (2017.01) |
| *B32B 17/10* | (2006.01) |
| *B33Y 70/00* | (2020.01) |
| *B29K 27/12* | (2006.01) |
| *B29K 105/24* | (2006.01) |

(52) U.S. Cl.
CPC .......... *C09D 127/12* (2013.01); *B29C 64/124* (2017.08); *B32B 17/10697* (2013.01); *B33Y 70/00* (2014.12); *B29K 2027/12* (2013.01); *B29K 2105/24* (2013.01); *B29K 2995/0039* (2013.01); *B29K 2995/0065* (2013.01); *B32B 2307/702* (2013.01); *B32B 2307/724* (2013.01)

(58) Field of Classification Search
None
See application file for complete search history.

(56) References Cited

U.S. PATENT DOCUMENTS

| | | |
|---|---|---|
| 4,200,538 A | 4/1980 | Seita et al. |
| 5,498,657 A | 3/1996 | Sugiyama et al. |
| 5,589,557 A | 12/1996 | Navarrini et al. |
| 5,646,223 A | 7/1997 | Navarrini et al. |
| 8,119,765 B2 | 2/2012 | Ito |
| 2005/0182217 A1 | 8/2005 | Kashiwagi et al. |
| 2010/0056752 A1 | 4/2010 | Okamoto et al. |
| 2019/0329491 A1 | 10/2019 | Yu et al. |
| 2019/0390081 A1 | 12/2019 | Rolland et al. |

FOREIGN PATENT DOCUMENTS

JP    2007153970 A   *   6/2007

OTHER PUBLICATIONS

Resnick et al., Teflon(R) AF Amorphous Fluoropolymers, Modern Fluoropolymers, Chapter 22, pp. 397-419. (Year: 1997).*
Machine translation of JP 2007-153970 A. (Year: 2007).*
Hoffman et al., Rheological Properties & Molecular Weight Distributions of Four Perfluorinated Thermoplastic Polymers, AC Polymer Chemistry Symposium. (Year: 2009).*
International Search Report mailed Jul. 7, 2021 for International Application No. PCT/US 21/26821.
Yavarri et al. 'Dioxolan-based Perfluoropolymers with Superior Membrane Gas Separation Properties', Macromolecules, 2018, vol. 51, pp. 2489-2497. p. 2490, col. 2, para 2, Figure 1 ;p. 2491, Figure 3a.
PCT Search Report from co-pending, related PCT Application No. PCT/US2021/26857, mailed Aug. 17, 2021.

* cited by examiner

*Primary Examiner* — Ramsey Zacharia
(74) *Attorney, Agent, or Firm* — Thomas | Horstemeyer, LLP

(57) ABSTRACT

Described herein are optically transparent and semipermeable windows composed of at least one layer of an amorphous crosslinked fluorinated copolymer. Also disclosed are a process and apparatus for three-dimensional continuous liquid interface production (CLIP) printing using the windows described herein. The amorphous crosslinked fluorinated copolymers have improved mechanical properties, thereby reducing the susceptibility of the window to brittle failures such as cracking and crack propagation. The gas permeable windows have superior durability and reliability compared with other available structures and compositions.

49 Claims, No Drawings

GAS PERMEABLE WINDOWS COMPOSED OF AMORPHOUS CROSSLINKED FLUORINATED COPOLYMERS AND METHODS OF MAKING AND USING THEREOF

CROSS REFERENCE TO RELATED APPLICATIONS

This application claims the benefit of U.S. Provisional Application No. 63/009,112 filed on Apr. 13, 2020 and U.S. Provisional Application No. 63/009,117 filed on Apr. 13, 2020, both of which are incorporated herein by reference in their entireties.

BACKGROUND

Continuous liquid interface production (CLIP) printing is a method of three-dimensional printing that uses photopolymerization to create smooth-sided solid objects of a wide variety of shapes using polymerizable resins and liquids. This printing methodology was recently developed as provided in U.S. Pat. Nos. 9,360,757, 10,016,938, and 10,144,181 to DeSimone et al. The continuous process begins with a pool of liquid photopolymer resin. Part of the pool bottom is transparent to ultraviolet light, which is referred to as the "window." An ultraviolet light beam shines through the window, illuminating the precise cross-section of the object. The light causes the resin to solidify. The object rises slowly enough to allow the resin to flow under and maintain contact with the bottom of the object.

An oxygen-permeable membrane lies below the resin, which creates a "dead zone" (persistent liquid interface) preventing the resin from attaching to the window. In the dead zone, a polymerization inhibitor is maintained so that essentially no polymerization occurs in this layer. However, polymerization does occur in a gradient fashion in the liquid layer immediately above this thin dead zone.

The dead zone is maintained by the use of a semipermeable window, which allows a polymerization inhibitor to pass through the window into the polymerizable liquid immediately adjacent to the window, thereby preventing solidification of the material in the dead zone. Typically, oxygen is used as the polymerization inhibitor, and the oxygen passing through the window comes from a reservoir of air or oxygen underneath the window. The bottom layer, which contacts the inhibitor supply reservoir is a rigid, optically transparent, gas permeable supporting layer, such as porous glass or polydimethylsiloxane or another rigid, permeable polymer. The top layer, which contacts the polymerizable liquid, typically includes a polymer film that is optically transparent and permeable to the inhibitor, but also chemically inert and not easily wetted by the polymerizable liquids. Hence, amorphous fluoropolymer films, such as UV-curable perfluoropolyethers or Teflon AF® polymers are typically preferred as the top layer material. Optionally, materials such as silane coupling agents may be used to promote adhesion of the top polymer film layer to the underlying rigid support layer. However, there is still a need for windows used in CLIP printing that have polymer films with improved mechanical properties.

SUMMARY

Described herein are optically transparent and semipermeable windows composed of at least one layer of an amorphous crosslinked fluorinated copolymer. Also disclosed are a process and apparatus for three-dimensional continuous liquid interface production (CLIP) printing using the windows described herein. The amorphous crosslinked fluorinated copolymers have improved mechanical properties, thereby reducing the susceptibility of the window to brittle failures such as cracking and crack propagation. The gas permeable windows have superior durability and reliability compared with other available structures and compositions.

Other methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

As used in the specification and the appended claims, the singular forms "a," "an" and "the" include plural referents unless the context clearly dictates otherwise. Thus, for example, reference to "a fluorinated ring monomer," "a comonomer," or "a copolymer," include, but are not limited to, mixtures or combinations of two or more such fluorinated ring monomers, comonomers, or copolymers, and the like.

The term "gas" as used herein means a gas or a vapor.

The term "polymer" as used herein generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic and atactic symmetries.

The term "highly fluorinated" as used herein means that at least 50% of the available hydrogen bonded to carbon have been replaced by fluorine.

The terms "fully-fluorinated" and "perfluorinated" as used herein are interchangeable and refer to a compound where all of the available hydrogens bonded to carbon have been replaced by fluorines.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a C1 alkyl, C1-C2 alkyl, C1-C3 alkyl, C1-C4 alkyl, C1-C5 alkyl, C1-C6 alkyl, C1-C7 alkyl, C1-C8 alkyl, C1-C9 alkyl, C1-C10 alkyl, and the like up to and including a C1-C24 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. Alternatively, the term "monohaloalkyl" specifically refers to an alkyl group that is substituted with a single halide, e.g. fluorine, chlorine, bromine, or iodine. The term "polyhaloalkyl" specifically refers to an alkyl group that is independently substituted with two or more halides, i.e. each halide substituent need not be the same halide as another halide substituent, nor do the multiple instances of a halide substituent need to be on the same carbon. The term "alkoxyalkyl" specifically refers to an alkyl group that is substituted with one or more alkoxy groups, as described below. The term "aminoalkyl" specifically refers to an alkyl group that is substituted with one or more amino groups. The term "hydroxyalkyl" specifically refers to an alkyl group that is substituted with one or more hydroxy groups. When "alkyl" is used in one instance and a specific term such as "hydroxyalkyl" is used in another, it is not meant to imply that the term "alkyl" does not also refer to specific terms such as "hydroxyalkyl" and the like.

The term "alkenyl" or "olefinic" as used herein is a fluorocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene or olefin is present, or it can be explicitly indicated by the bond symbol C=C. In one aspect, an "alkenyl" or "olefinic" compound can include two carbon-carbon double bonds (e.g., is a diene).

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', 'less than y', and 'less than z'. Likewise, the phrase 'about x, y, z, or greater' should be interpreted to include the specific ranges of 'about x', 'about y', and 'about z' as well as the ranges of 'greater than x', 'greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

All percentages herein are by volume unless otherwise stated. Unless otherwise specified, temperatures referred to herein are based on atmospheric pressure (i.e. one atmosphere).

Described herein are optically transparent and semipermeable windows composed of at least one layer of an amorphous crosslinked fluorinated copolymer. In one aspect, the windows include (a) a semipermeable and optically transparent substrate having a first surface and a second surface and (b) a layer comprising an amorphous crosslinked fluorinated copolymer adjacent to at least one of the first surface or the second surface. Also disclosed are a process and apparatus for three-dimensional continuous liquid interface production (CLIP) printing using the windows described herein. Each component of the windows described herein and methods for making and using the same are provided below.

Amorphous Crosslinked Fluorinated Copolymers

The windows described herein include at least one layer of one or more amorphous crosslinked fluorinated copolymers on a surface of a semipermeable and optically transparent substrate. In one aspect, the amorphous crosslinked fluorinated copolymer comprises a plurality of first copolymers and a plurality of crosslinker units covalently bonded to the first polymers. In one aspect, the amorphous crosslinked fluorinated copolymer is produced by (a) copolymerizing one or more fluorinated ring monomers and a crosslinker in the amount of from 0.2 mol % to 40 mol % to produce a first copolymer and (b) crosslinking the first copolymer to produce the amorphous crosslinked fluoropolymer. Described below are the components and methods for making the crosslinked copolymers.

Fluorinated Ring Monomers

In one aspect, the amorphous crosslinked fluorinated copolymers are produced from one more different fluorinated ring monomers. In one aspect, the fluorinated ring monomer includes a five-membered ring. In another aspect, the fluorinated ring monomer includes a six-membered ring. In still another aspect, the fluorinated ring monomer contains a five-membered ring and a six-membered ring, or includes two five-membered rings. Further in this aspect, when the fluorinated ring monomer contains two rings, the rings can be fused to form a bicyclic structure. In another aspect, the fluorinated ring monomer can be perfluorinated.

In another aspect, the fluorinated ring monomer can have an olefinic structure, where the monomer possesses one or more carbon-carbon double bonds. In another aspect, the fluorinated ring monomer can be created through cyclopolymerization of a linear monomer that has an olefin on one end and a vinyl ether on the other.

Scheme 1: fluorinated ring monomers containing a single ring

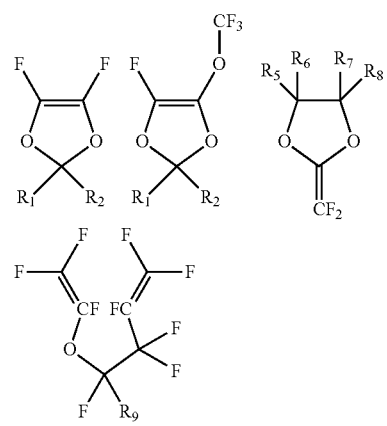

in which:

$R_1$ and $R_2$ are independently F, $CF_3$, $CF_2CF_3$, $CF_2H$, $CF_2CF_2H$, $CFHCF_3$, $CFHCF_2H$;

$R_3$ and $R_4$ are independently F, $CF_3$, or $CF_2CF_3$, $CF_2H$, $CF_2CF_2H$, $CFHCF_3$, $CFHCF_2H$;

$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and $R_9$ is F, $CF_3$, or $CF_2CF_3$.

Scheme 2: fluorinated ring monomers containing multiple rings

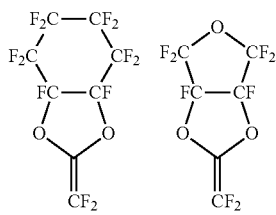

In another aspect, the fluorinated ring monomer can include one or more acyclic monomers that, upon polymerization, produce a fluorinated ring. For example, the fourth structure depicted in Scheme 1 can cyclize upon polymerization to produce a five-membered ring.

In one aspect, the fluorinated ring monomer can be a single compound in Schemes 1 or 2. In another aspect, the fluorinated ring monomer can be two or more different compounds in Schemes 1 or 2.

In another aspect, disclosed herein is an amorphous copolymer produced by polymerizing (a) one or more fluorinated ring monomers in the amount of from about 1 mol % to about 99.5 mol %, wherein the fluorinated ring monomer is at least a five-membered ring and (b) a comonomer in the amount of from about 0.5 mol % to about 99 mol %. In one aspect, the amount of fluorinated ring monomer used to produce the copolymers described herein is 1, 5, 10, 15, 20, 25, 30, 35, 40, 45, 50, 55, 60, 65, 70, 75, 80, 85, 90, 95, or about 99.5 mol %, or a combination of any of the foregoing values, or a range encompassing any of the foregoing values. In one aspect, the amount of fluorinated ring monomer used to produce the copolymers described herein is from about 80 mol % to about 99 mol %.

Crosslinkers

The crosslinkers provided herein are compounds that possess functional groups that permit crosslinking between two or more different copolymers. In one aspect, the crosslinker is an olefinic compound that when copolymerized with a fluorinated ring monomer produces an amorphous fluorinated copolymer. In one aspect, the amorphous fluorinated copolymer has a plurality of crosslinkable groups that are pendant to the copolymer backbone. In one aspect, the crosslinker comprises a perfluorinated olefinic compound comprising at least one crosslinkable group.

The nature of the crosslinkable group can vary depending upon the crosslinking conditions. In one aspect, the crosslinkable group comprises a photoactive group or a thermally active group. In one aspect, the crosslinkable group comprises an alkyl ester group, a cyano group, or a fluorinated vinyl ether group.

In one aspect, the crosslinker comprises one or more compounds having the structure I:

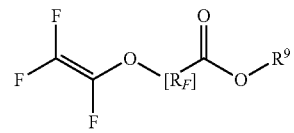

wherein $R_F$ is a perfluoroalkyl group having from 1 to 6 carbon atoms with optionally 1 or 2 ether oxygen atoms, and $R^9$ is a linear or branched alkyl group having from 1 to 6 carbon atoms.

In one aspect, $R^9$ in structure I is methyl or ethyl. In another aspect, $R^F$ in structure I is $(CF_2)_r$, where r is 1, 2, 3, or 4. In another aspect, $R^F$ in structure I is $(CF_2)_s$—O—$(CF_2)_t$, where s and t are 1, 2, 3, or 4.

In one aspect, the crosslinker comprises one or more compounds having the structure II:

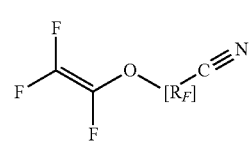

wherein $R_F$ is a perfluoroalkyl group having from 1 to 6 carbon atoms with optionally 1 or 2 ether oxygen atoms.

In one aspect, $R^F$ in structure II is $(CF_2)_r$, where r is 1, 2, 3, or 4. In another aspect, $R^F$ in structure II is $(CF_2)_s$—O—$(CF_2)_t$, where s and t are 1, 2, 3, or 4.

In another aspect, the crosslinker comprises one or more compounds having the structure III:

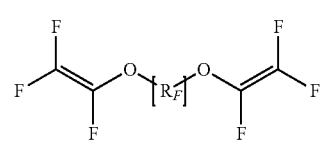

wherein $R_F$ is a perfluoroalkyl group having from 1 to 6 carbon atoms with optionally 1 or 2 ether oxygen atoms.

In one aspect, $R^F$ in structure III is $(CF_2)_r$, where r is 1, 2, 3, or 4. In another aspect, $R^F$ in structure III is $(CF_2)_s$—O—$(CF_2)_t$, where s and t are 1, 2, 3, or 4.

In one aspect, the crosslinker is:

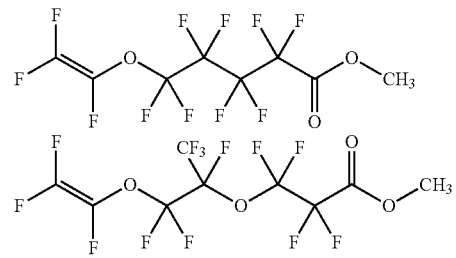

-continued

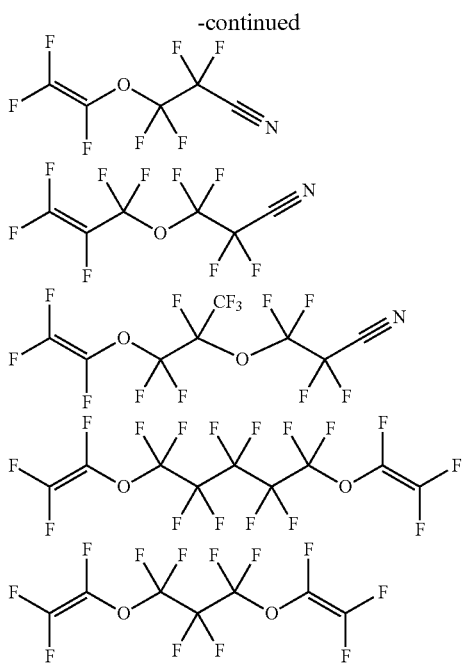

or any combination thereof.

The crosslinker can include one or more different compounds. In one aspect, the amount of crosslinker used to produce the amorphous fluorinated copolymers described herein is 1, 2, 3, 4, 5, 6, 7, 8, 9, 10, 11, 12, 13, 14, 15, 16, 17, 18, 19, or about 20 mol %, or a combination of any of the foregoing values, or a range encompassing any of the foregoing values. In one aspect, the amount of crosslinker used to produce the copolymers described herein is from about 0.2 mol % to about 10 mol %, or about 0.2 mol % to about 5 mol %.

Comonomers

In one aspect, the fluorinated ring monomer and the crosslinker are copolymerized with a third monomer, where the third comonomer is different from the fluorinated ring monomer and the crosslinker. In one aspect, the third monomer is a fluorinated vinyl compound or a fluorinated vinyl ether compound. In another aspect, the comonomer is a fluorinated compound with two or more ether oxygens. In one aspect, the third comonomer can be perfluorinated. In one aspect, the third comonomer is an olefinic compound having two or more ether oxygens. In another aspect, the third comonomer is an olefinic compound having two or more perfluoro ether groups (—CF$_2$—O—CF$_2$—).

In one aspect, the third comonomer includes one or more compounds having the following structure:

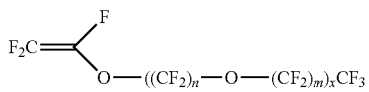

where n and m are independently 1, 2, or 3, and x is 1 or 2.

In a further aspect, the third comonomer can be a single compound, or can be two or more different compounds having the structure above.

In another aspect, representative third comonomers useful herein include, but are not limited to, those shown in Scheme 3 below, and any combination thereof:

Scheme 3: monomers containing multiple ether oxygens

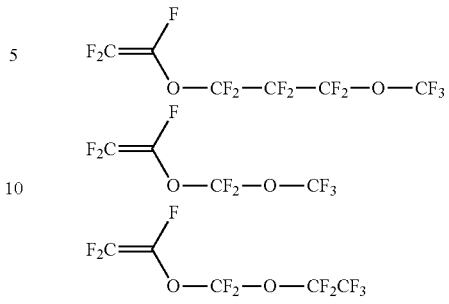

In one aspect, the amount of third comonomer used to produce the copolymers described herein can be from about 0.5, 1, 5, 10, 15, 20, 25, 30, 35, 40, 45, 50, 55, 60, 65, 70, 75, 80, 85, 90, 95, or about 99.5 mol %, or a combination of any of the foregoing values, or a range encompassing any of the foregoing values. In a further aspect, the amount of comonomer is from about 1 mol % to about 20 mol %.

Polymerization Method

In one aspect, the amorphous fluorinated copolymers described herein can be made by solution or aqueous emulsion polymerization. In another aspect, if the solution method is used, suitable solvents can be poly- or perfluorinated compounds such as perfluorooctane, hexafluoroisopropanol (HFIP), 1,1,1,3,3,3-hexafluoro-2-methoxypropane (HFMOP), Vertrel® XF (CF$_3$CFHCFHCF$_2$CF$_3$), or Fluorinert® FC-43 (perfluorotri-n-butyl amine). In an alternative aspect, if the aqueous emulsion method is used, a suitable surfactant will be used. In one aspect, the disclosed polymers can optionally be polymerized in the absence of any solvent. In a further aspect, initiators can be chosen from those typically used for fluoropolymers such as hydrocarbon peroxides, fluorocarbon peroxides, hydrocarbon peroxydicarbonates, and inorganic types such as persulfates.

In one aspect, depending on the relative reactivity of the monomers to be used in the polymerization, they can either be added as a single precharge, or they may need to be co-fed as a ratioed mixture to produce the desired copolymer composition.

In another aspect, when the polymerization is determined to be complete, the polymer can be isolated using methods known in the art. In one aspect, for the solution method, the solvent (and any unreacted monomer(s)) can be removed by distillation at atmospheric or lower pressure. In some aspects, due to the typically high viscosity and amorphous nature of the polymers of this disclosure, further rigorous drying is often required to get rid of residual solvent. In a further aspect, this can involve heating to between 200 to 300° C. at atmospheric or lower pressure for between 2 to 48 hours. In another aspect, tor the aqueous emulsion method, the emulsion can be broken by several methods including freeze/thaw, addition of a strong mineral acid such as nitric acid, high shear mixing, or a combination of these methods.

The Examples provide non-limiting procedures for producing the amorphous fluorinated copolymers described herein.

Structural Features of Amorphous Fluorinated Copolymers

The amorphous fluorinated copolymers described herein include the first copolymer comprises a plurality of fluorinated ring units in the amount of 1 mol % to 99.5 mol %, and wherein the fluorinated ring unit is at least a five membered ring, and a plurality of crosslinker units. In one aspect, the fluorinated ring units can be present in an amount of about 1, 5, 10, 15, 20, 25, 30, 35, 40, 45, 50, 55, 60, 65, 70, 75, 80, 85, 90, 95, or about 99.5 mol %, or a combination of any of the foregoing values, or a range encompassing any of the foregoing values. In one aspect, the fluorinated ring unit is present in the amount of from about 80 mol % to about 99 mol %. In another aspect, the crosslinker unit can be present in an amount of about 1, 2, 3, 4, 5, 6, 7, 8, 9, 10, 11, 12, 13, 14, 15, 16, 17, 18, 19, or about 20 mol %, or a combination of any of the foregoing values, or a range encompassing any of the foregoing values. In one aspect, the amount of crosslinker used to produce the copolymers described herein is from about 1 mol % to about 10 mol %, or about 1 mol % to about 5 mol %.

In some aspects, the fluorinated ring unit can be perfluorinated. In another aspect, the fluorinated ring unit can include a five- or six-membered ring. In one aspect, the fluorinated ring unit can include one or more of the following structures:

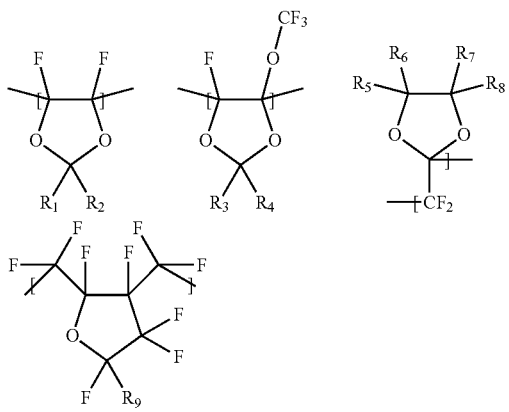

wherein:
R$_1$ and R$_2$ are independently F, CF$_3$, CF$_2$CF$_3$, CF$_2$H, CF$_2$CF$_2$H, CFHCF$_3$, CFHCF$_2$H;
R$_3$ and R$_4$ are independently F, CF$_3$, or CF$_2$CF$_3$, CF$_2$H, CF$_2$CF$_2$H, CFHCF$_3$, CFHCF$_2$H;
R$_5$, R$_6$, R$_7$, and R$_8$ are independently F, CF$_3$, or CF$_2$CF$_3$, CF$_2$H, CF$_2$CF$_2$H, CFHCF$_3$, CFHCF$_2$H and R$_6$ and R$_7$ can be contained within a 5- or 6-membered ring; and
R$_9$ is F, CF$_3$, or CF$_2$CF$_3$.

In another aspect, the fluorinated ring unit can be a single structural unit. In an alternative aspect, the fluorinated ring unit can be two or more different structural units. In one aspect, the fluorinated ring unit can be

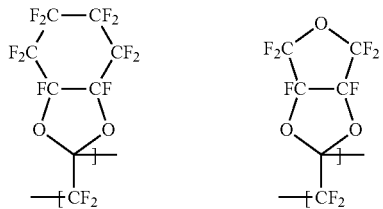

or any combination thereof.

In one aspect, the amorphous fluorinated copolymer has a plurality of crosslinker units with crosslinkable groups that are pendant to the copolymer backbone. In one aspect, the crosslinker comprises a perfluorinated olefinic compound comprising at least one crosslinkable group. In one aspect, the crosslinker unit has the structure IV, V, or VI, where R$^F$ and R$^9$ are as defined above with respect to structures I, II, and III:

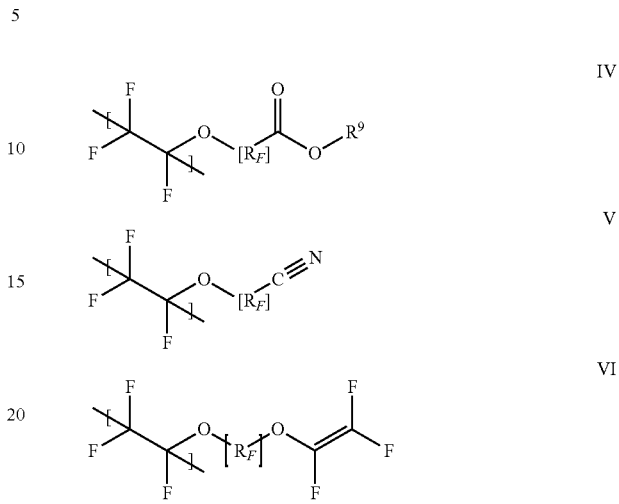

In another aspect, when a third comonomer is used to produce the amorphous fluorinated copolymer, a third comonomeric unit can be present. In one aspect, the third comonomeric unit can be perfluorinated. In one aspect, the third comonomeric unit includes one or more units having the following structure:

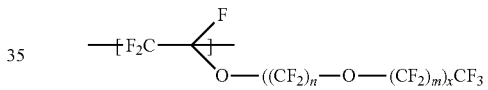

where n and m are independently 1, 2, or 3, and x is 1 or 2.

In one aspect, the third comonomeric unit can be a single structural unit. In another aspect, the third comonomeric unit can be two or more different structural units. In another aspect, the third comonomeric unit can be:

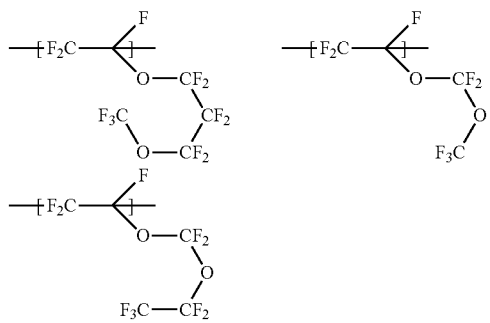

or any combination thereof.

Copolymer Properties and Composition of the Amorphous Fluorinated Copolymers

In one aspect, the composition of the amorphous fluorinated copolymers used herein can usually be determined by $^{19}$F NMR spectroscopy. Further in this aspect, the polymers are readily soluble in perfluorobenzene and an insert probe of deuterobenzene (C$_6$D$_6$) can be used to give a lock signal. In a further aspect, differential scanning calorimetry (DSC)

can be used to determine the glass transition temperature ($T_g$), and the molecular weight distribution can be found by using gel permeation chromatography (GPC) with a styrene-divinyl benzene column in a perfluorinated solvent coupled with a multi-detector analysis module including refractive index, low-angle light scattering, and right-angle light scattering detectors or using other suitable equipment and/or methods as known in the art. If desired, in one aspect, the type and concentration of end groups can also be determined by pressing a film of the polymer and acquiring an infrared (IR) spectrum in transmission mode.

In one aspect, the amorphous fluorinated copolymer can have a glass transition temperature of from about 0° C. to about 300° C., or about 25° C., 50° C., 75° C., 100° C., 125° C., 150° C., 175° C., 200° C., 225° C., 250° C., 275° C., or 300° C., or a combination of any of the foregoing values, or a range encompassing any of the foregoing values.

In still another aspect, the amorphous fluorinated copolymer can have a number average molecular weight ($M_n$) of from about 10 kDa to about 2,000 kDa, or 10 kDa, 50 kDa, 100 kDa, 150 kDa, 200 kDa, 250 kDa, 300 kDa, 350 kDa, 400 kDa, 450 kDa, 500 kDa, 550 kDa, 600 kDa, 650 kDa, 700 kDa, 750 kDa, 800 kDa, 850 kDa, 900 kDa, 950 kDa, 1,000 kDa, 1,050 kDa, 1,100 kDa, 1,150 kDa, 1,200 kDa, 1,250 kDa, 1,300 kDa, 1,350 kDa, 1,400 kDa, 1,450 kDa, 1,500 kDa, 1550 kDa, 1,600 kDa, 1,650 kDa, 1,700 kDa, 1,750 kDa, 1,800 kDa, 1,850 kDa, 1,900 kDa, 1,950 kDa, or 2,000 kDa, or a combination of any of the foregoing values, or a range encompassing any of the foregoing values.

In still another aspect, the amorphous fluorinated copolymer can have a weight average molecular weight ($M_w$) of from about 10,000 g/mol to about 3,000,000 g/mol, or 10,000 g/mol, 50,000 g/mol, 100,000 g/mol, 200,000 g/mol, 300,000 g/mol, 400,000 g/mol, 500,000 g/mol, 600,000 g/mol, 700,000 g/mol, 800,000 g/mol, 900,000 g/mol, 1,000,000 g/mol, 1,100,000 g/mol, 1,200,000 g/mol, 1,300,000 g/mol, 1,400,000 g/mol, 1,500,000 g/mol, 1,600,000 g/mol, 1,700,000 g/mol, 1,800,000 g/mol, 1,900,000 g/mol, 2,000,000 g/mol, 2,100,000 g/mol, 2,200,000 g/mol, 2,300,000 g/mol, 2,400,000 g/mol, 2,500,000 g/mol, 2,600,000 g/mol, 2,700,000 g/mol, 2,800,000 g/mol, 2,900,000 g/mol, or 3,000,000 g/mol, or a combination of any of the foregoing values, or a range encompassing any of the foregoing values.

Semipermeable and Optically Transparent Substrate

The substrate used to produce the windows described herein generally are composed of a semipermeable or gas permeable) material. The rigid semipermeable substrate can be made of any suitable material that is optically transparent at the relevant wavelengths (or otherwise transparent to the radiation source, whether or not it is visually transparent as perceived by the human eye—i.e., an optically transparent window may in some embodiments be visually opaque), including but not limited to porous or microporous glass, and the rigid gas permeable polymers used for the manufacture of rigid gas permeable contact lenses. See, e.g., Norman G. Gaylord, U.S. Pat. No. RE31,406; see also U.S. Pat. Nos. 7,862,176; 7,344,731; 7,097,302; 5,349,394; 5,310,571; 5,162,469; 5,141,665; 5,070,170; 4,923,906; and 4,845,089. In some embodiments such materials are characterized as glassy and/or amorphous polymers and/or substantially crosslinked that they are essentially non-swellable.

In one aspect, the substrate is formed of a material that does not swell when contacted with the liquid resin or material to be polymerized (i.e., is "non-swellable"). Suitable materials for the rigid semipermeable member include rigid amorphous fluoropolymers, such as those described in U.S. Pat. Nos. 5,308,685 and 5,051,115. For example, such fluoropolymers are particularly useful over silicones that would potentially swell when used in conjunction with organic liquid resin inks to be polymerized. For some liquid resin inks, such as more aqueous-based monomeric systems and/or some polymeric resin ink systems that have low swelling tendencies, silicone-based window materials may be suitable.

The semipermeable member typically includes a top surface portion, a bottom surface portion, and an edge surface portion. The build surface is on the top surface portion; and the feed surface may be on one, two, or all three of the top surface portion, the bottom surface portion, and/or the edge surface portion.

In some aspect, the substrate has a thickness of from about 0.01 mm to about 100 millimeters or more depending upon the size of the item being fabricated.

The permeability of the substrate to the polymerization inhibitor will depend upon conditions such as the pressure of the atmosphere and/or inhibitor, the choice of inhibitor, the rate or speed of fabrication, etc. In general, when the inhibitor is oxygen, the permeability of the semipermeable member to oxygen may be from 10 or 20 Barrers, up to 1,000 or 2,000 Barrers.

Preparation of Amorphous Crosslinked Fluorinated Copolymers

The amorphous fluorinated copolymers described herein are crosslinked to produce amorphous crosslinked fluorinated copolymers. In one aspect, the amorphous crosslinked fluorinated copolymer can be applied to the surface of the semipermeable and optically transparent substrate followed by crosslinking. In one aspect, the amorphous fluorinated copolymer is applied the substrate by spin casting or solution casting.

Suitable crosslinking technique or conditions thereof may be determined, at least in part, based upon the selected crosslinking monomer and the desired results. In one aspect, the amorphous fluorinated copolymer is heated for a sufficient time and temperature to crosslink the copolymer. In one aspect, the amorphous fluorinated copolymer is crosslinked by heating the copolymer at a temperature greater than 300° C. In another aspect, the amorphous fluorinated copolymer is crosslinked by heating the copolymer at a temperature of from about 300° C. to about 350° C., or about 300° C., 305° C., 310° C., 315° C., 320° C., 325° C., 330° C., 335° C., 340° C., 345° C., or 350° C., where any value can be a lower and upper endpoint of a range (e.g., 310° C. to 330° C.). In another aspect, the amorphous fluorinated copolymer is heated from 0.5 minutes to 60 minutes, or 0.5 minutes, 5 minutes, 10 minutes, 15 minutes, 20 minutes, 25 minutes, 30 minutes, 35 minutes, 40 minutes, 45 minutes, 50 minutes, 55 minutes, or 60 minutes, where any value can be a lower and upper endpoint of a range (e.g., 10 minutes to 30 minutes).

In another aspect, the amorphous fluorinated copolymer is crosslinked by exposing the copolymer to UV radiation. In one aspect, the amorphous fluorinated copolymer is exposed to UV radiation at a wavelength of less than 300 nm to crosslink the amorphous fluorinated copolymer. In another aspect, the amorphous fluorinated copolymer is exposed to UV radiation at a wavelength of about 250 nm to about 300 nm, or about 250 nm, 255 nm, 260 nm, 265 nm, 270 nm, 275 nm, 280 nm, 285 nm, 290 nm, or 300 nm, where any value can be a lower and upper endpoint of a range (e.g., 260 nm to 290 nm). In another aspect, the amorphous fluorinated copolymer is exposed to UV radiation from 0.5 hours to 48 hours, or 0.5 hours, 1 hour, 3 hours, 6 hours, 12 hours, 18 hours, 24 hours, 30 hours, 36 hours, or 48 hours, where any value can be a lower and upper endpoint of a range (e.g., 3 hours to 24 hours).

In certain aspects, the amorphous crosslinked fluorinated copolymer material has different thermal, mechanical, and/or solubility properties than the uncrosslinked copolymer. In some aspects, the crosslinked copolymer has improved cracking resistance as compared to similar uncrosslinked copolymers. In some aspects, the amorphous crosslinked fluoropolymer has a notched tensile strength that is greater than the notched tensile strength of the un-crosslinked amorphous copolymer. In an aspect, the amorphous crosslinked fluoropolymer has a notched tensile strength that is at least a factor of two greater than the notched tensile strength of the un-crosslinked amorphous copolymer.

Gas Permeable Windows and Applications Thereof

The use of the amorphous fluorinated copolymers described herein have several unique properties, which makes them especially suitable for the production and use of CLIP windows. Unlike most other perfluorinated fluoropolymers, the amorphous fluorinated copolymers described herein have appreciable solubility and can be dissolved in highly fluorinated or perfluorinated solvents. This allows them to be easily cast as films or coatings, so they may be easily applied as a thin coating on a surface of the semipermeable and optically transparent substrate. In another aspect, the amorphous fluorinated copolymers described herein are saturated and contain only single bonds between C, F, and O atoms. They therefore demonstrate excellent optical clarity over a wide range of wavelengths, from the infrared to the ultraviolet, which meets the required transparency in CLIP window applications. Also, since amorphous fluorinated copolymers are both generally soluble only in highly fluorinated or perfluorinated solvents with excellent thermal and chemical stability, they are stable in the presence of the polymerizable monomer in a CLIP system.

In one aspect, the window includes (a) a semipermeable and optically transparent substrate having a first surface and a second surface and (b) a layer comprising an amorphous crosslinked fluorinated copolymer adjacent to at least one of the first surface or the second surface. In one aspect, the window is produced by the method comprising (a) applying a layer of an amorphous fluorinated copolymer on the substrate; and crosslinking the amorphous fluorinated copolymer.

Any of a number of methods may be used to apply the amorphous fluorinated copolymer to the surface of the substrate. In one aspect, the polymer can be applied by spin coating, dip coating, and solution casting. One particularly advantageous method of spin coating has been described by Feller et al. (U.S. Pat. No. 10,438,827). In this method, the amorphous fluorinated copolymer is dissolved in solution of highly fluorinated solvent, and the substrate to be coated is placed on a rotating chuck with a fluid retaining wall at the periphery of the chuck. The polymer solution is dispensed onto the substrate, forming a thin layer on the substrate, while the excess solution is retained by the peripheral wall. After the initial coating layer has dried into a film, the rotational speed of the chuck is reduced, and the excess fluid retained by the wall is allowed to flow into the central region of the substrate again, where it may be cast as another film layer. Since the amorphous fluorinated copolymer solution is typically extremely expensive, this method of spin casting is often preferred since it converts the polymer mass from the solution into film form very efficiently. After the amorphous fluorinated copolymer has been applied to the substrate, it can be crosslinked as described above (e.g., applying heat or UV radiation to the polymer layer).

In certain aspects, after crosslinking of the amorphous fluorinated copolymer, the window can be subsequently heated or baked to relax or reduce strain on the amorphous crosslinked fluorinated copolymer layer and promote adhesion to the substrate. After crosslinking, the amorphous crosslinked fluorinated copolymer may shrink relative to the support layer or it may accumulate mechanical stresses from differential contraction between adjacent areas. In one aspect, the window may be baked at a temperature of at least 50° C., at least 100° C., at least 200° C. or higher. The window may be baked for a period from 1 hour to 2 days or longer, for example from 1 hour to 10 hours.

The optimal thickness of the amorphous crosslinked fluorinated copolymer layer will depend, at least in part, upon the parameters of the CLIP apparatus and process, including the permeability of the inhibitor in the amorphous crosslinked fluorinated copolymer layer, the required flux of the of the inhibitor through the window, the differential expansion between the amorphous crosslinked fluorinated copolymer layer and the substrate, and the conditions required to obtain a smooth surface of the amorphous crosslinked fluorinated copolymer layer of the window. In one aspect, the window can include a layer or coating of the amorphous crosslinked fluorinated copolymer. In one aspect, the layer or coating has a thickness of about 1 µm to about 100 µm, or about 1 µm, 2 µm, 5 µm 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, or 100 µm, or a combination of any of the foregoing values, or a range encompassing any of the foregoing values.

The windows described herein are permeable to oxygen. Here, both the semipermeable and optically transparent substrate and the layer of the amorphous crosslinked fluorinated copolymer are permeable to oxygen. This feature is significant when the window is used in a CLIP printing apparatus where oxygen is the inhibitor. In one aspect, the window has an oxygen permeance of at least 1 gas permeation units (gpu).

The amorphous crosslinked fluorinated copolymer layer is mechanically robust and exhibits high thermal stability and chemical resistance. They are typically soluble only in highly fluorinated or perfluorinated solvents prior to crosslinking and, thus, they are essentially insoluble after crosslinking. They are also typically stable over many years when immersed in acids, alkalis, oils, low-molecular-weight esters, ethers and ketones, aliphatic and aromatic hydrocarbons, and oxidizing agents. They are also thermally stable over many years at temperatures below the glass transition temperature. Thus, they are suitable for use at elevated temperatures in a CLIP apparatus when in contact with organic monomers and aggressive cleaning compounds.

The window may be utilized in a CLIP printing apparatus. In one aspect, the CLIP printing apparatus includes: (a) a support carrier which holds and moves an object being formed in the printer, (b) a tank of polymerizable liquid to be incorporated into the printed object, (c) the transparent a window as described herein located at the bottom of the polymerizable liquid tank with the layer of the amorphous crosslinked fluorinated copolymer contacting the polymerizable liquid, (d) a radiation source, configured to irradiate the build region through the build plate and form a solid polymerized region therein from the liquid polymer, and (e) a controller to move the support carrier and to control the irradiation source in such fashion as to cause the polymerization to occur in a way that produces the desired solid object. The windows described herein have improved resistance against cracking. When the window is employed in an apparatus for CLIP printing, the resulting CLIP apparatus will have improved reliability with respect to reduced costs for replacement of window.

Aspects

Aspect 1. A window comprising (a) a semipermeable and optically transparent substrate having a first surface and a second surface and (b) a layer comprising an amorphous crosslinked fluorinated copolymer adjacent to at least one of the first surface or the second surface.

Aspect 2. The window of Aspect 1, wherein the substrate comprises a porous glass, a semipermeable fluoropolymer, a rigid gas-permeable polymer, or a combination thereof Aspect 3. The window of Aspect 1 or 2, wherein the window is partially permeable to oxygen.

Aspect 4. The window in any one of Aspects 1-3, wherein the window has an oxygen permeance of at least 1 gas permeation units (gpu).

Aspect 5. The window in any one of Aspects 1-4, wherein the amorphous crosslinked fluoropolymer layer of the window has a notched tensile strength that is greater than a notched tensile strength of the layer of the amorphous fluorinated copolymer prior to crosslinking.

Aspect 6. The window in any one of Aspects 1-4, wherein the amorphous crosslinked fluoropolymer layer of the window has a notched tensile strength that is at least two times greater than a notched tensile strength of the layer of the amorphous fluorinated copolymer prior to crosslinking.

Aspect 7. The window in any one of Aspects 1-6, wherein the layer of the amorphous crosslinked fluorinated copolymer has a thickness of about 1 micron to about 100 microns.

Aspect 8. The window in any one of Aspects 1-7, wherein the window is produced by the method comprising
(a) applying a layer of an amorphous fluorinated copolymer on the substrate; and
(b) crosslinking the amorphous fluorinated copolymer.

Aspect 9. The window of Aspect 8, wherein the layer of the amorphous fluorinated copolymer is applied to the substrate by spin casting or solution casting.

Aspect 10. The window of Aspect 8 or 9, wherein crosslinking comprises exposing the layer of the amorphous fluorinated copolymer to ultraviolet radiation or thermal energy.

Aspect 11. The window in any one of Aspects 8-10, further comprising after step (b) baking the window at elevated temperature to reduce strain on the layer of the amorphous crosslinked fluorinated copolymer and promote adhesion to the substrate.

Aspect 12. The window in any one of Aspects 1-11, wherein the amorphous crosslinked fluorinated copolymer is produced by (a) copolymerizing one or more fluorinated ring monomers in the amount of 1 mol % to 99.5 mol %, wherein the fluorinated ring monomer is at least a five membered ring, and a crosslinker in the amount of from 0.2 mol % to 40 mol % to produce a first copolymer and (b) crosslinking the first copolymer to produce the amorphous crosslinked fluoropolymer.

Aspect 13. The window of Aspect 12, wherein the fluorinated ring monomer is perfluorinated.

Aspect 14. The window of Aspect 12, wherein the fluorinated ring monomer is an olefinic compound.

Aspect 15. The window of Aspect 12, wherein the fluorinated ring monomer comprises a five or six membered ring.

Aspect 16. The window of Aspect 12, wherein the fluorinated ring monomer is produced by the cyclopolymerization of a linear monomer that has an olefin on one end of the monomer and a vinyl ether on the other end of the monomer.

Aspect 17. The window of Aspect 12, wherein the fluorinated ring monomer comprises one or more of the following compounds:

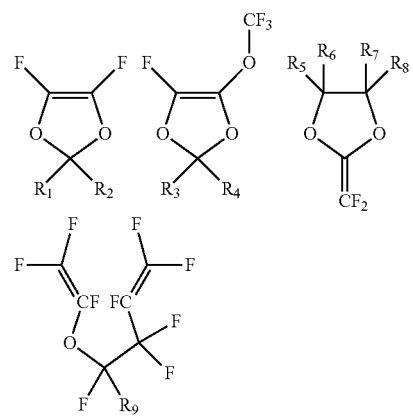

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$;
$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and
$R_9$ is F, $CF_3$, or $CF_2CF_3$.

Aspect 18. The window of Aspect 12, wherein the fluorinated ring monomer is a single compound.

Aspect 19. The window of Aspect 12, wherein the fluorinated ring monomer is two or more different compounds.

Aspect 20. The window of Aspect 12, wherein the fluorinated ring monomer is:

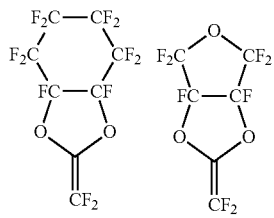

or a combination thereof.

Aspect 21. The window in any one of Aspects 12-20, wherein the fluorinated ring monomer is in the amount of 80 mol % to 99 mol %.

Aspect 22. The window in any one of Aspects 12-21, wherein the crosslinker comprises a perfluorinated olefinic compound comprising at least one crosslinkable group.

Aspect 23. The window of Aspect 22, wherein the crosslinkable group comprises a photoactive group or a thermally active group.

Aspect 24. The window of Aspect 22, wherein the crosslinkable group comprises an alkyl ester group, a cyano group, or a fluorinated vinyl ether group.

Aspect 25. The window in any one of Aspects 12-24, wherein the crosslinker comprises one or more compounds having the structure I:

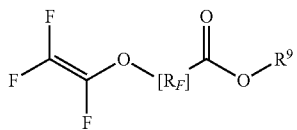

I wherein $R_F$ is a perfluoroalkyl group having from 1 to 6 carbon atoms with optionally 1 or 2 ether oxygen atoms, and $R^9$ is a linear or branched alkyl group having from 1 to 6 carbon atoms.

Aspect 26. The window in any one of Aspects 12-24, wherein the crosslinker comprises one or more compounds having the structure II:

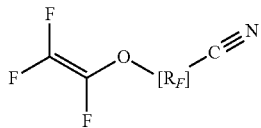

II wherein $R_F$ is a perfluoroalkyl group having from 1 to 6 carbon atoms with optionally 1 or 2 ether oxygen atoms.

Aspect 27. The window in any one of Aspects 12-24, wherein the crosslinker comprises one or more compounds having the structure III:

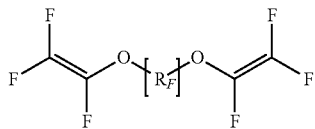

III wherein $R_F$ is a perfluoroalkyl group having from 1 to 6 carbon atoms with optionally 1 or 2 ether oxygen atoms.

Aspect 28. The window in any one of Aspects 12-27, wherein the crosslinker is a single compound.

Aspect 29. The window in any one of Aspects 12-27, wherein the crosslinker is two or more different compounds.

Aspect 30. The window in any one of Aspects 12-27, wherein the crosslinker is:

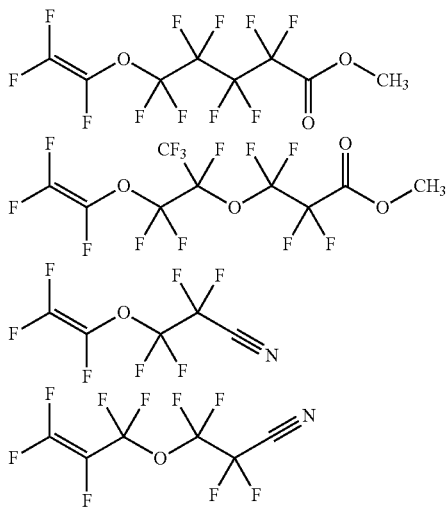

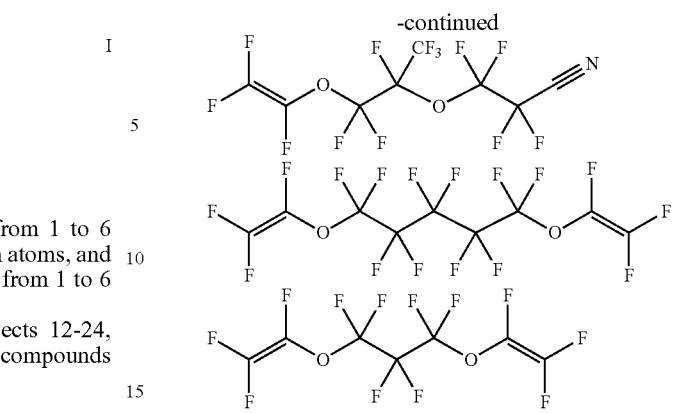

or any combination thereof.

Aspect 31. The window in any one of Aspects 12-30, wherein the crosslinker is in the amount of 1 mol % to 20 mol %.

Aspect 32. The window of Aspect 12, wherein the fluorinated ring monomer comprises one or more of the following compounds:

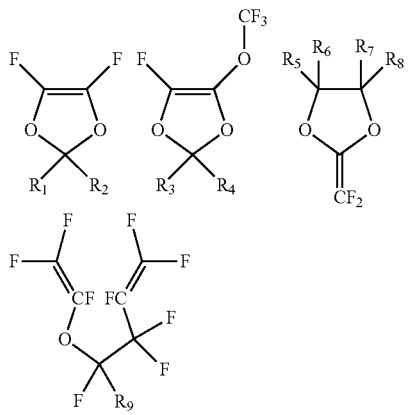

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$;
$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and
$R_9$ is F, $CF_3$, or $CF_2CF_3$; and
the crosslinker comprises one or more compounds having the following structure:

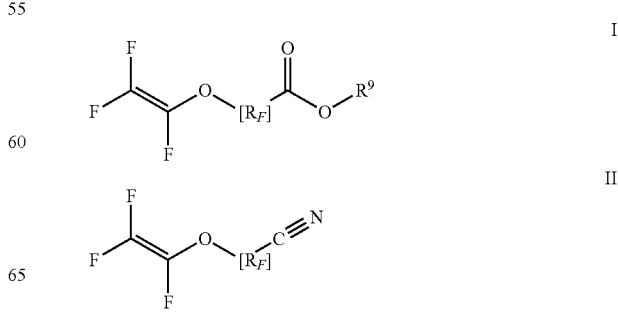

-continued

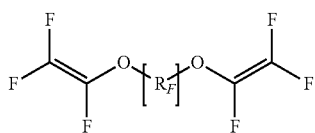
III wherein $R_F$ is a perfluoroalkyl group having from 1 to 6 carbon atoms with optionally 1 or 2 ether oxygen atoms, and $R^9$ is a linear or branched alkyl group having from 1 to 6 carbon atoms.

Aspect 33. The window in any one of Aspects 12-32, wherein the fluorinated ring monomer and the crosslinker are copolymerized with a third monomer comprising a fluorinated vinyl compound or a fluorinated vinyl ether compound.

Aspect 34. The window of Aspect 33, wherein the third monomer has the structure IV:

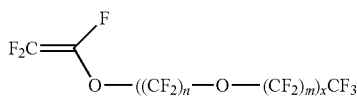

wherein n and m are independently 1, 2, or 3, and x is 1 or 2.

Aspect 35. The window of Aspect 33, wherein the third monomer is

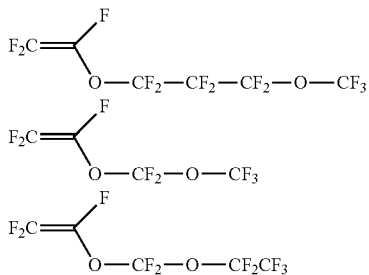

Aspect 36. The window in any one of Aspects 12-35, wherein the first copolymer is produced by solution or aqueous emulsion polymerization.

Aspect 37. The window in any one of Aspects 12-36, wherein the copolymerization is conducted in the presence of an initiator.

Aspect 38. The window of Aspect 37, wherein the initiator comprises a hydrocarbon peroxide, a fluorocarbon peroxide, a hydrocarbon peroxydicarbonate, an inorganic fluorocarbon initiator, or any combination thereof.

Aspect 39. The window in any one of Aspects 12-38, wherein the first copolymer is crosslinked by exposing the first copolymer to UV radiation at a wavelength of less than 300 nm.

Aspect 40. The window in any one of Aspects 12-38, wherein the first copolymer is crosslinked by exposing the first copolymer to UV radiation at a wavelength of less than 300 nm from about 0.5 hours to about 48 hours.

Aspect 41. The window in any one of Aspects 12-38, wherein the first copolymer is crosslinked by exposing the first copolymer to UV radiation at a wavelength of about 250 nm to about 300 nm from about 0.5 hours to about 48 hours.

Aspect 42. The window in any one of Aspects 12-38, wherein the first copolymer is crosslinked by heating the first copolymer at a temperature of from about 300° C. to about 350° C. for 0.5 minutes to 60 minutes.

Aspect 43. The window of Aspect 1, wherein the amorphous crosslinked fluorinated copolymer comprises a plurality of first copolymers and a plurality of crosslinker units covalently bonded to the first polymers, wherein the first copolymer comprises a plurality of fluorinated ring units in the amount of 1 mol % to 99.5 mol %, and wherein the fluorinated ring unit is at least a five membered ring.

Aspect 44. The window of Aspect 43, wherein the fluorinated ring unit is perfluorinated.

Aspect 45. The window of Aspect 43, wherein the fluorinated ring unit comprises a five or six membered ring.

Aspect 46. The window of Aspect 43, wherein the fluorinated ring unit comprises one or more of the following structures:

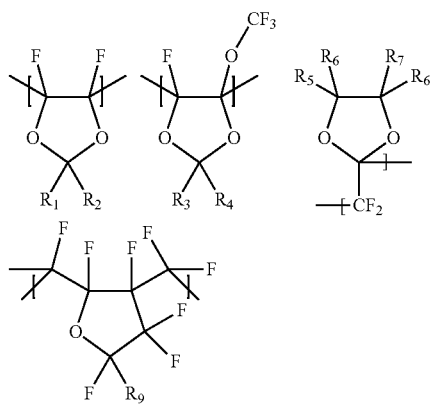

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$;
$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and
$R_9$ is F, $CF_3$, or $CF_2CF_3$.

Aspect 47. The window in any one of Aspects 43-46, wherein the first copolymer further comprises a perfluorinated comonomeric unit that is not the fluorinated ring unit or crosslinker unit.

Aspect 48. The window of Aspect 47, wherein the comonomeric unit comprises one or more units having the following structure:

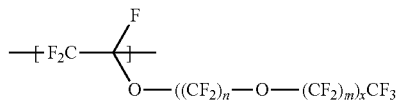

wherein n and m are independently 1, 2, or 3, and x is 1 or 2.

Aspect 49. The window of Aspect 47, wherein the comonomeric unit is a single structural unit.

Aspect 50. The window of Aspect 47, wherein the comonomeric unit is two or more different structural units.

Aspect 51. The window of Aspect 47, wherein the comonomeric unit is:

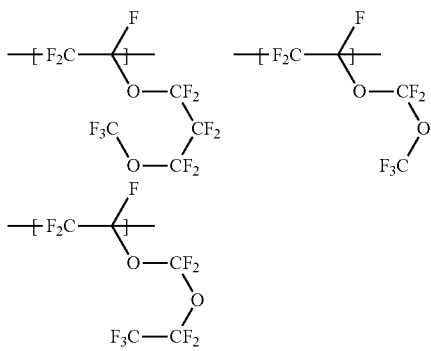

or any combination thereof.

Aspect 52. The window in any one of Aspects 47-51, wherein the comonomeric unit is in the amount of 1 mol % to 20 mol %.

Aspect 53. The window in any one of Aspects 1-52, wherein the first copolymer has a glass transition temperature of from 0° C. to 300° C.

Aspect 54. The window in any one of Aspects 1-52, wherein the first copolymer has a $M_n$ of from 10 kDa to 2,000 kDa.

Aspect 55. The window in any one of Aspects 1-52, wherein the first copolymer has a $M_w$ of from 10,000 g/mol to 3,000,000 g/mol.

Aspect 56. An apparatus for forming a three-dimensional object from a polymerizable liquid comprising the window in any one of Aspects 1-52.

Aspect 57. The apparatus of Aspect 56 comprising:
(a) a carrier for holding and moving an object being formed in a printer;
(b) a tank of polymerizable liquid, wherein the window is disposed along a bottom surface of the tank so that the layer of the amorphous crosslinked fluorinated copolymer contacts the polymerizable liquid;
(c) a radiation source configured to irradiate the polymerizable liquid in a build region through the window, thereby forming a solid polymerized region therein; and
(d) a controller that moves the support carrier and controls the radiation source such that polymerization of the polymerizable liquid produces the three-dimensional object.

Aspect 58. A method of forming a three-dimensional object, comprising:
providing a carrier and a window in any one of Aspects 1-52 having a build surface, wherein the carrier and the build surface define a build region therebetween;
filling the build region with a polymerizable liquid, wherein the layer of the amorphous crosslinked fluorinated copolymer on the window is in contact with the polymerizable liquid; and
irradiating the build region through the window to form a solid polymer from the polymerizable liquid while concurrently advancing the carrier away from the build surface to form the three-dimensional object from the polymerizable liquid.

Aspect 59. An amorphous crosslinked fluorinated copolymer produced by the process comprising (a) copolymerizing one or more fluorinated ring monomers in the amount of 1 mol % to 99.5 mol %, wherein the fluorinated ring monomer is at least a five membered ring, and a crosslinker in the amount of from 0.2 mol % to 40 mol % to produce a first copolymer and (b) crosslinking the first copolymer to produce the amorphous crosslinked fluoropolymer.

Aspect 60. The copolymer of Aspect 59, wherein the fluorinated ring monomer is

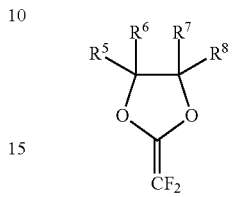

wherein $R_5$, $R_6$, $R_7$, and $R_8$ are independently F, $CF_3$, or $CF_2CF_3$, $CF_2H$, $CF_2CF_2H$, CFHCF$_3$, CFHCF$_2$H and $R_6$ and $R_7$ can be contained within a 5- or 6-membered ring.

Aspect 61. The copolymer of Aspect 60, wherein the crosslinker comprises a perfluorinated olefinic compound comprising at least one crosslinkable group.

Aspect 62. The copolymer of Aspect 61, wherein the crosslinkable group comprises a photoactive group or a thermally active group.

Aspect 63. The copolymer of Aspect 61, wherein the crosslinkable group comprises an alkyl ester group, a cyano group, or a fluorinated vinyl ether group.

Aspect 64. The copolymer of Aspect 60, wherein the crosslinker comprises one or more compounds having the structure I:

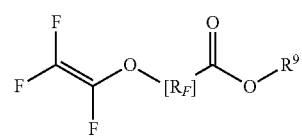

wherein $R_F$ is a perfluoroalkyl group having from 1 to 6 carbon atoms with optionally 1 or 2 ether oxygen atoms, and
$R^9$ is a linear or branched alkyl group having from 1 to 6 carbon atoms.

Aspect 65. The copolymer of Aspect 59, wherein the crosslinker comprises one or more compounds having structure II:

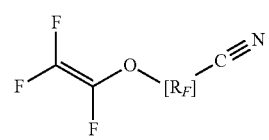

wherein $R_F$ is a perfluoroalkyl group having from 1 to 6 carbon atoms with optionally 1 or 2 ether oxygen atoms.

Aspect 66. The copolymer of Aspect 59, wherein the crosslinker comprises one or more compounds having structure III:

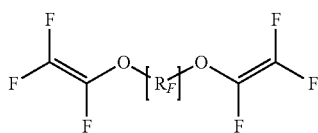

III wherein $R_F$ is a perfluoroalkyl group having from 1 to 6 carbon atoms with optionally 1 or 2 ether oxygen atoms.

Aspect 67. The copolymer of Aspect 59, wherein the crosslinker is:

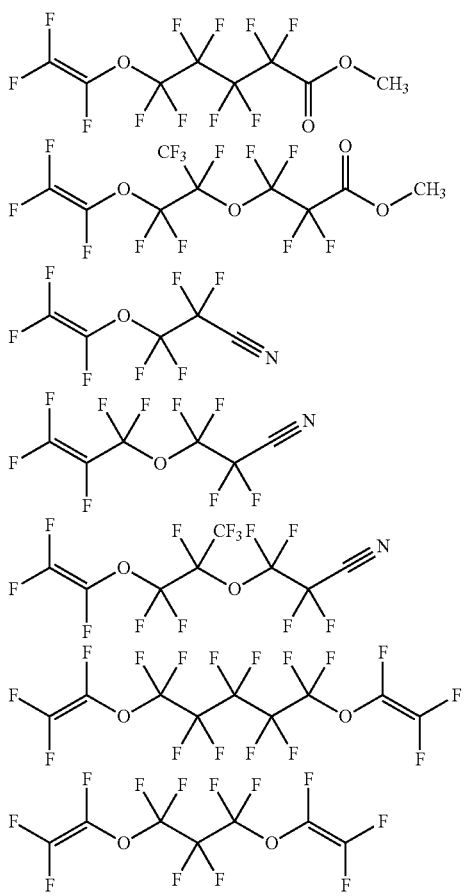

or any combination thereof.

Aspect 68. The copolymer of Aspect 59, wherein the fluorinated ring monomer and the crosslinker are copolymerized with a third monomer comprising a fluorinated vinyl compound or a fluorinated vinyl ether compound.

Aspect 69. The copolymer of Aspect 68, wherein the third monomer has the structure IV:

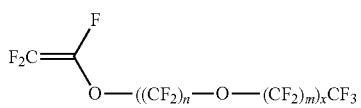

wherein n and m are independently 1, 2, or 3, and x is 1 or 2.

Aspect 70. The copolymer of Aspect 68, wherein the third monomer is

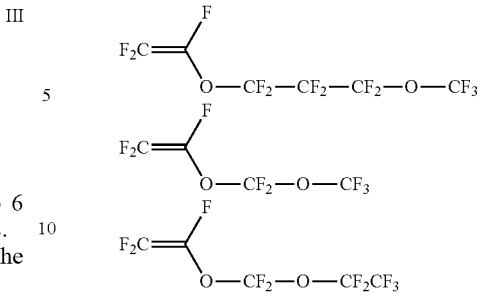

Aspect 71. The copolymer of Aspect 59, wherein the first copolymer is produced by solution or aqueous emulsion polymerization.

Aspect 72. An amorphous crosslinked fluorinated copolymer comprising a plurality of first copolymers and a plurality of crosslinker units covalently bonded to the first polymers, wherein the first copolymer comprises a plurality of fluorinated ring units in the amount of 1 mol % to 99.5 mol %, and wherein the fluorinated ring unit is at least a five membered ring.

Aspect 73. The copolymer of Aspect 72, wherein the fluorinated ring unit comprises the following structures:

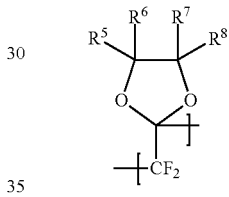

wherein $R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Test Methods

The polymeric materials, windows, and polymeric layers disclosed herein may be characterized using one or more of the following methods.

Glass Transition Temperature

The glass transition temperature of the polymeric materials may be evaluated using Differential scanning calorimetry (DSC), for example according to ASTM E1356-08 (2014), modified as necessary or desired for the disclosed materials and devices.

Notch Tensile Test

The polymeric materials may be evaluated according to ASTM F1473-18 (modified as necessary or desired for the disclosed materials and devices) to determine the notch tensile characteristics of the polymeric material.

Fracture Toughness

The polymeric materials may be evaluated according to ASTM E1820-20 (modified as necessary or desired for the disclosed materials and devices) to determine Fracture Toughness.

Determining J-R Curves

The polymeric materials may be evaluated according to ASTM D6068-10(2018) (modified as necessary or desired for the disclosed materials and devices) to characterize the crack growth resistance of the polymeric material.

Bent-Beam Method

The polymeric materials may be evaluated according to ASTM D3929-03(2015) (modified as necessary or desired for the disclosed materials and devices), to characterize the stress cracking properties of the polymeric material.

Example 1: Synthesis of PBVE-co-EVE-Me Copolymer

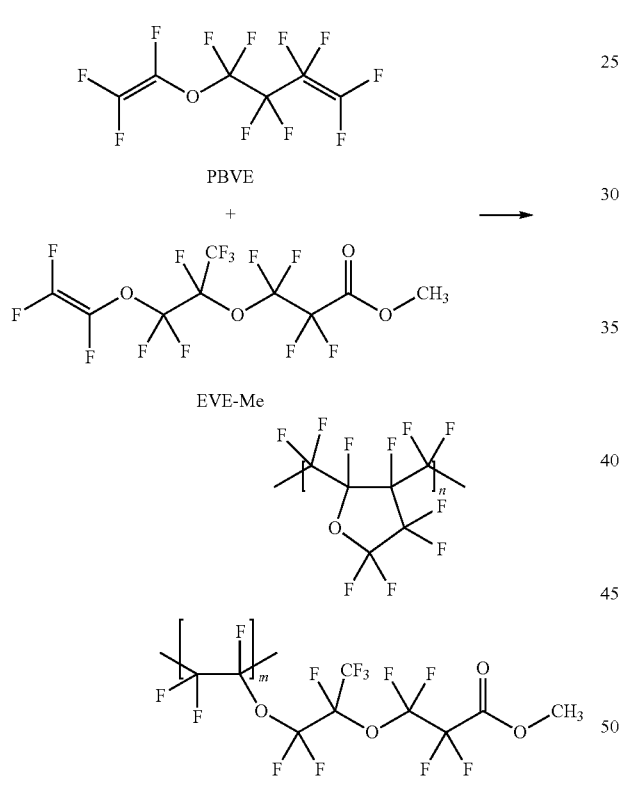

To a 1 L stainless steel reactor was added a magnetic stir bar and perfluorooctane (300 mL) solvent. The lid was attached and valves to an argon source and vacuum (30 Torr) were connected. The solvent was degassed by cycling four times through vacuum/argon backfill. PBVE ($CF_2$=CF—O—$CF_2CF_2CF$=$CF_2$, 50 mL, 80 g) was next added via syringe with a 12-inch stainless steel needle, along with EVE-Me ($CF_2$=CF—O—$CF_2$ 3.1 mL, 5.0 g). The reactor was placed in an oil bath set to 60° C. and initiated using hexafluoropropylene oxide dimer peroxide (HFPO-DP, $CF_3CF_2CF_2OCF(CF_3)COO]_2$) solution (0.16 M in Vertrel XF. 0.5 mL precharge, 1.5 mL added over 8 hrs. by syringe pump). After 24 hours the solution was transferred to a 500 mL round bottom flask and reduced in vacuo at 50° C. and 30 Torr to afford 15 g of soft colorless polymer that was still wet with solvent. Several grams of this wet material were further dried in open air in an aluminum pan at 280° C. for 24 h. This dry material was submitted for $T_g$ determination by DSC, molecular weight by GPC, and comonomer ratio by $^{19}F$ NMR spectroscopy.

Results:

$T_g$=93° C. (PBVE homopolymer=108° C.). Material was amorphous due to lack of observable melting endotherm.

$M_n$=468,000 g/mol, $M_w$=508,000 g/mol

% EVE-Me by $^{19}F$ NMR=2.7 mol %

IR (transmission mode): —$CH_3$ v=2968 cm$^{-1}$, ester C=O v=1792 cm$^{-1}$

Example 2: Synthesis of PBVE-co-PFBVOP Copolymer

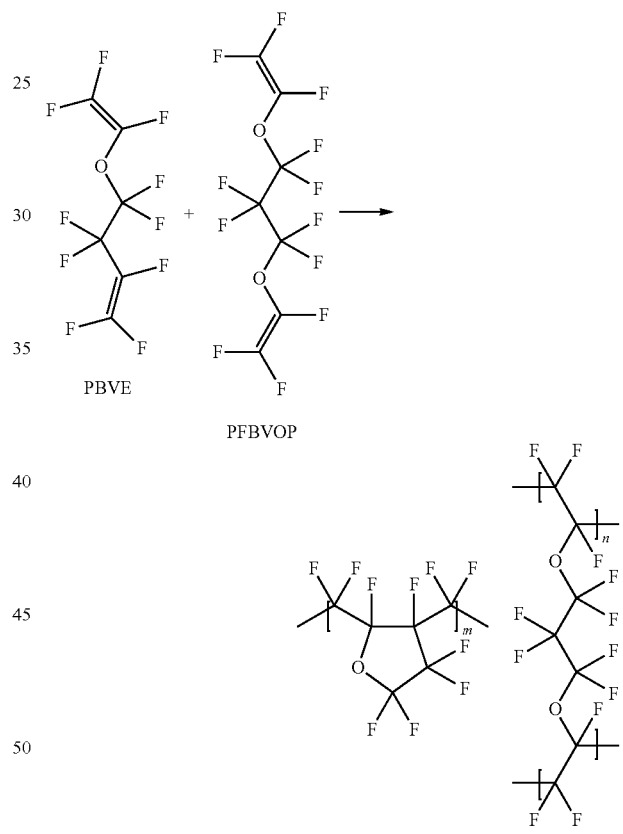

A 30 mL glass vial was loaded with a magnetic stirbar, PBVE (10.0 mL, 16.0 g), and PFBVOP ($CF_2$=CF—O—$CF_2CF_2CF_2$—O—CF=$CF_2$, 3.0 mL, 4.9 g). No added solvent was used for this polymerization. Argon gas was bubbled through the monomer mixture for 3 minutes to remove any oxygen. Next, perfluorobenzoyl peroxide initiator (40 mg, made as detailed in Oldham, P. H.; Williams, G. H. *J. Chem. Soc.* (C), 1970, 1260) was added. The cap was tightened and the vial was placed in an oil bath and stirred magnetically at 80° C. for 24 h. The result was a 20 g cylinder of a clear and rigid amorphous fluoropolymer glass. The polymer that was formed by reaction between the two monomers may then be further crosslinked to create a 3D network.

Example 3: Synthesis of PDD-co-EVE-Me Copolymer

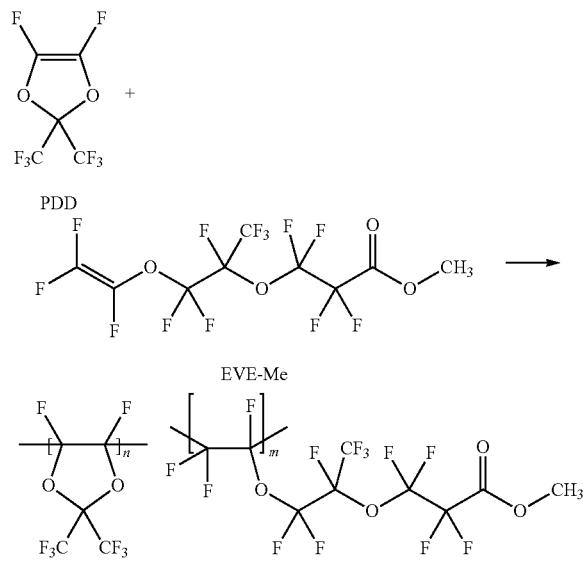

Perfluorooctane solvent (250 mL, 445 g) was added to a 500 mL Duran glass jar along with a magnetic stirbar. The lid was attached and valves to an argon source and vacuum (30 Torr) were connected. The solvent was degassed by cycling four times through vacuum/argon backfill. Freshly distilled PDD (30.0 mL, 51.6 g) was added via syringe, followed by the EVE-Me comonomer (3.2 mL, 5.0 g). The polymerization was initiated by addition of hexafluoropropylene oxide dimer peroxide (HFPO-DP, [CF$_3$CF$_2$CF$_2$OCF (CF$_3$)COO]$_2$) solution (2.0 mL of 0.16 M in Vertrel XF). The solution was stirred at 22° C. for 6 hours at which time it had completely gelled. The gel was dried in a vacuum oven (275° C., 200 milliTorr) for 15 hours to obtain 40.2 g of white copolymer. Evidence of incorporation of the EVE-Me monomer was determined by IR (transmission mode): —CH$_3$ v=2964 cm$^{-1}$, ester C=O v=1789 cm$^{-1}$.

Example 4: Fabrication of Semipermeable Window from PBVE-co-EVE-Me Copolymer A high-permeability amorphous fluoropolymer gutter layer is spin-coated onto a porous glass support layer. After drying to remove substantially all of the solvent from polymer, UV light (254 nm and intensity) for (specify time) to crosslink the polymer layer. Finally, the window is baked at (specify temperature) for (specify time) to relax strains resulting from the crosslinking process.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A window comprising (a) a semipermeable and optically transparent substrate having a first surface and a second surface and (b) a layer comprising an amorphous crosslinked fluorinated copolymer adjacent to at least one of the first surface or the second surface,
   wherein the amorphous crosslinked fluorinated copolymer comprises a plurality of first copolymers and a plurality of crosslinker units covalently bonded to the first polymers,
   wherein the first copolymer comprises a plurality of fluorinated ring units,
   wherein the fluorinated ring unit is at least a five membered ring, and
   wherein the first copolymer has a M$_w$ of from 100,000 g/mol to 3,000,000 g/mol.

2. The window of claim 1, wherein the substrate comprises a porous glass, a semipermeable fluoropolymer, a rigid gas-permeable polymer, or a combination thereof.

3. The window of claim 1, wherein the window is partially permeable to oxygen.

4. The window of claim 1, wherein the window has an oxygen permeance of at least 1 gas permeation units (gpu).

5. The window of claim 1, wherein the amorphous crosslinked fluoropolymer layer of the window has a notched tensile strength that is greater than a notched tensile strength of the layer of the amorphous fluorinated copolymer prior to crosslinking.

6. The window of claim 1, wherein the amorphous crosslinked fluoropolymer layer of the window has a notched tensile strength that is at least two times greater than a notched tensile strength of the layer of the amorphous fluorinated copolymer prior to crosslinking.

7. The window of claim 1, wherein the layer of the amorphous crosslinked fluorinated copolymer has a thickness of about 1 micron to about 100 microns.

8. The window of claim 1, wherein the window is produced by the method comprising
   (a) applying a layer of an amorphous fluorinated copolymer on the substrate; and
   (b) crosslinking the amorphous fluorinated copolymer.

9. The window of claim 8, wherein the layer of the amorphous fluorinated copolymer is applied to the substrate by spin casting or solution casting.

10. The window of claim 8, wherein crosslinking comprises exposing the layer of the amorphous fluorinated copolymer to ultraviolet radiation or thermal energy.

11. The window of claim 10, further comprising after step (b) baking the window at elevated temperature to reduce strain on the layer of the amorphous crosslinked fluorinated copolymer and promote adhesion to the substrate.

12. The window of claim 1, wherein the amorphous crosslinked fluorinated copolymer is produced by (a) copolymerizing one or more fluorinated ring monomers in the amount of 1 mol % to 99.5 mol %, wherein the fluorinated ring monomer is at least a five membered ring, and a crosslinker in the amount of from 0.2 mol % to 40 mol % to produce a first copolymer and (b) crosslinking the first copolymer to produce the amorphous crosslinked fluoropolymer.

13. The window of claim 12, wherein the fluorinated ring monomer is perfluorinated.

14. The window of claim 12, wherein the fluorinated ring monomer is an olefinic compound.

15. The window of claim 12, wherein the fluorinated ring monomer comprises a five or six membered ring.

16. The window of claim 12, wherein the fluorinated ring monomer is produced by the cyclopolymerization of a linear monomer that has an olefin on one end of the monomer and a vinyl ether on the other end of the monomer.

17. The window of claim 12, wherein the fluorinated ring monomer comprises one or more of the following compounds:

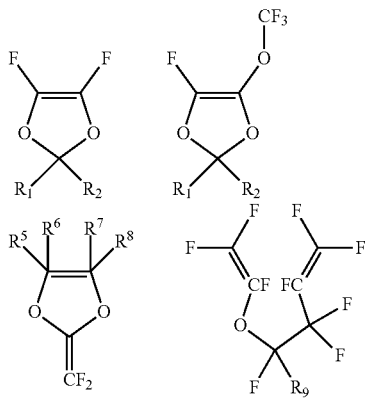

wherein $R_1$ and $R_2$ are independently F, $CF_3$, $CF_2CF_3$, $CF_2H$, $CF_2CF_2H$, $CFHCF_3$, $CFHCF_2H$;

$R_3$ and $R_4$ are independently F, $CF_3$, or $CF_2CF_3$, $CF_2H$, $CF_2CF_2H$, $CFHCF_3$, $CFHCF_2H$;

$R_5$, $R_6$, $R_7$, and $R_8$ are independently F, $CF_3$, or $CF_2CF_3$, $CF_2H$, $CF_2CF_2H$, $CFHCF_3$, and $CFHCF_2H$ and $R_6$ and $R_7$ can be contained within a 5- or 6-membered ring.

18. The window of claim 12, wherein the fluorinated ring monomer is:

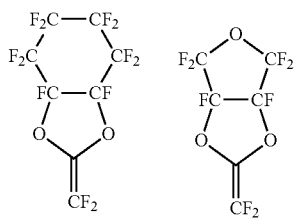

or a combination thereof.

19. The window of claim 12, wherein the fluorinated ring monomer is in the amount of 80 mol % to 99 mol %.

20. The window of claim 12, wherein the crosslinker comprises a perfluorinated olefinic compound comprising at least one crosslinkable group.

21. The window of claim 20, wherein the crosslinkable group comprises a photoactive group or a thermally active group.

22. The window of claim 20, wherein the crosslinkable group comprises an alkyl ester group, a cyano group, or a fluorinated vinyl ether group.

23. The window of claim 12, wherein the crosslinker comprises one or more compounds having the structure I:

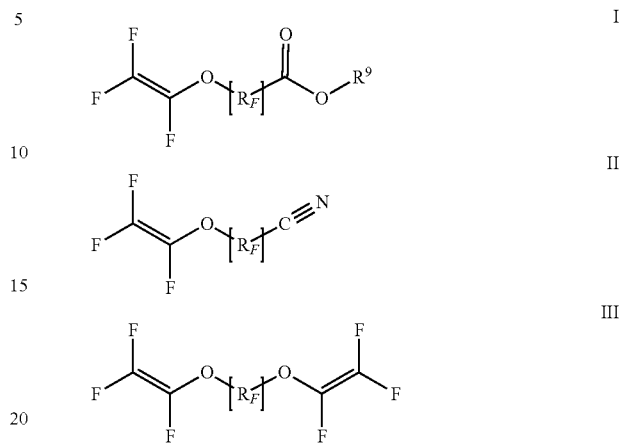

wherein $R_F$ is a perfluoroalkyl group having from 1 to 6 carbon atoms with optionally 1 or 2 ether oxygen atoms, and $R^9$ is a linear or branched alkyl group having from 1 to 6 carbon atoms.

24. The window of claim 12, wherein the crosslinker is:

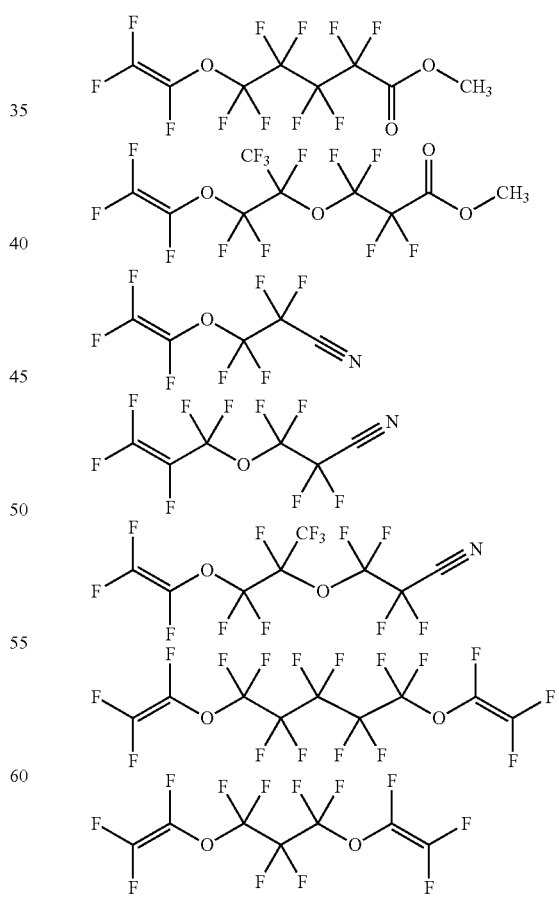

or any combination thereof.

25. The window of claim 12, wherein the crosslinker is in the amount of 1 mol % to 20 mol %.

26. The window of claim 12, wherein the fluorinated ring monomer comprises one or more of the following compounds:

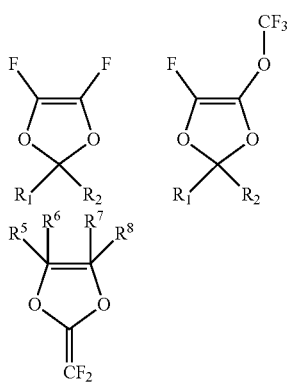

wherein $R_1$ and $R_2$ are independently F, $CF_3$, $CF_2CF_3$, $CF_2H$, $CF_2CF_2H$, $CFHCF_3$, $CFHCF_2H$;

$R_3$ and $R_4$ are independently F, $CF_3$, or $CF_2CF_3$, $CF_2H$, $CF_2CF_2H$, $CFHCF_3$, $CFHCF_2H$;

$R_5$, $R_6$, $R_7$, and $R_8$ are independently F, $CF_3$, or $CF_2CF_3$, $CF_2H$, $CF_2CF_2H$, $CFHCF_3$, and $CFHCF_2H$ and $R_6$ and $R_7$ can be contained within a 5- or 6-membered ring;

and the crosslinker comprises one or more compounds having the following structure:

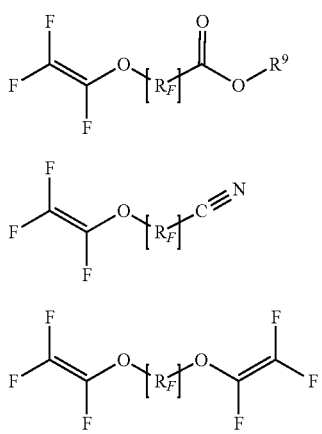

wherein $R_F$ is a perfluoroalkyl group having from 1 to 6 carbon atoms with optionally 1 or 2 ether oxygen atoms, and $R^9$ is a linear or branched alkyl group having from 1 to 6 carbon atoms.

27. The window of claim 12, wherein the fluorinated ring monomer and the crosslinker are copolymerized with a third monomer comprising a fluorinated vinyl compound or a fluorinated vinyl ether compound.

28. The window of claim 27, wherein the third monomer has the structure:

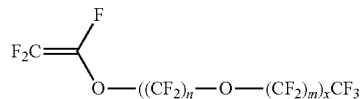

wherein n and m are independently 1, 2, or 3, and x is 1 or 2.

29. The window of claim 27, wherein the third monomer is

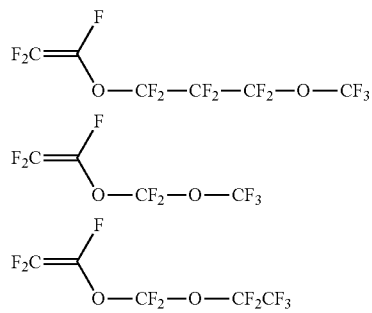

30. The window of claim 12, wherein the first copolymer is produced by solution or aqueous emulsion polymerization.

31. The window of claim 12, wherein the copolymerization is conducted in the presence of an initiator.

32. The window of claim 31, wherein the initiator comprises a hydrocarbon peroxide, a fluorocarbon peroxide, a hydrocarbon peroxydicarbonate, an inorganic fluorocarbon initiator, or any combination thereof.

33. The window of claim 12, wherein the first copolymer is crosslinked by exposing the first copolymer to UV radiation at a wavelength of less than 300 nm from about 0.5 hours to about 48 hours.

34. The window of claim 12, wherein the first copolymer is crosslinked by heating the first copolymer at a temperature of from about 300° C. to about 350° C. for 0.5 minutes to 60 minutes.

35. The window of claim 1, wherein the fluorinated ring unit is perfluorinated.

36. The window of claim 1, wherein the fluorinated ring unit comprises a five or six membered ring.

37. The window of claim 1, wherein the fluorinated ring unit comprises one or more of the following structures:

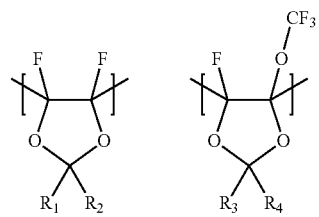

-continued

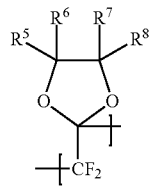 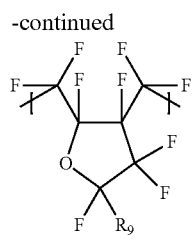

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$;
$R_5$, $R_6$, $R_7$, and $R_8$ are independently F, $CF_3$, or $CF_2CF_3$, $CF_2H$, $CF_2CF_2H$, $CFHCF_3$,
$CFHCF_2H$ and $R_6$ and $R_7$ can be contained within a 5- or 6-membered ring; and
$R_9$ is F, $CF_3$, or $CF_2CF_3$.

38. The window of claim 1, wherein the first copolymer further comprises a perfluorinated comonomeric unit that is not the fluorinated ring unit or crosslinker unit.

39. The window of claim 38, wherein the perfluorinated comonomeric unit comprises one or more units having the following structure:

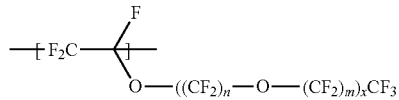

wherein n and m are independently 1, 2, or 3, and x is 1 or 2.

40. The window of claim 38, wherein the perfluorinated comonomeric unit is:

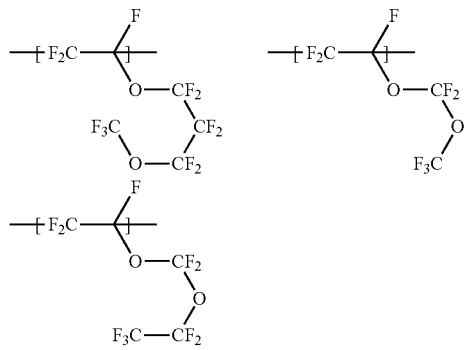

or any combination thereof.

41. The window of claim 38, wherein the perfluorinated comonomeric unit is in the amount of 1 mol % to 20 mol %.

42. The window of claim 1, wherein the first copolymer has a glass transition temperature of from 0° C. to 300° C.

43. The window of claim 1, wherein the first copolymer has a $M_n$ of from 10 kDa to 2,000 kDa.

44. An apparatus for forming a three-dimensional object from a polymerizable liquid comprising the window of claim 1.

45. The apparatus of claim 44 comprising:
(a) a carrier for holding and moving an object being formed in a printer;

(b) a tank of polymerizable liquid, wherein the window is disposed along a bottom surface of the tank so that the layer of the amorphous crosslinked fluorinated copolymer contacts the polymerizable liquid;
(c) a radiation source configured to irradiate the polymerizable liquid in a build region through the window, thereby forming a solid polymerized region therein; and
(d) a controller that moves the support carrier and controls the radiation source such that polymerization of the polymerizable liquid produces the three-dimensional object.

46. A method of forming a three-dimensional object, comprising:
providing a carrier and a window of claim 1 having a build surface, wherein the carrier and the build surface define a build region therebetween;
filling the build region with a polymerizable liquid, wherein the layer of the amorphous crosslinked fluorinated copolymer on the window is in contact with the polymerizable liquid; and
irradiating the build region through the window to form a solid polymer from the polymerizable liquid while concurrently advancing the carrier away from the build surface to form the three-dimensional object from the polymerizable liquid.

47. The window of claim 12, wherein the fluorinated ring monomer is produced by the cyclopolymerization of a linear monomer having the structure

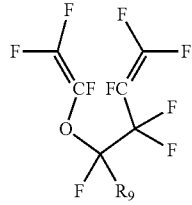

wherein $R_9$ is F, $CF_3$, or $CF_2CF_3$.

48. A window comprising (a) a semipermeable and optically transparent substrate having a first surface and a second surface and (b) a layer comprising an amorphous crosslinked fluorinated copolymer adjacent to at least one of the first surface or the second surface,
wherein the amorphous crosslinked fluorinated copolymer is produced by (a) copolymerizing one or more fluorinated ring monomers in the amount of 1 mol % to 99.5 mol %, wherein the fluorinated ring monomer is at least a five membered ring, and a crosslinker in the amount of from 0.2 mol % to 40 mol % to produce a first copolymer and (b) crosslinking the first copolymer to produce the amorphous crosslinked fluorinated copolymer,
wherein the crosslinker comprises a perfluorinated olefinic compound comprising at least one crosslinkable group, and the crosslinkable group comprises an alkyl ester group or a cyano group.

49. The window of claim 48, wherein the crosslinker comprises one or more compounds having the structure I or II:

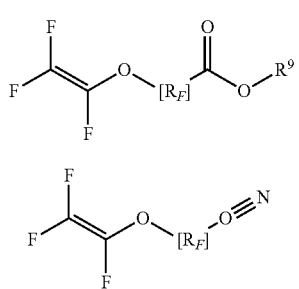  I
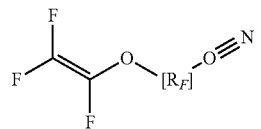  II
wherein $R_F$ is a perfluoroalkyl group having from 1 to 6 carbon atoms with optionally 1 or 2 ether oxygen atoms, and
$R^9$ is a linear or branched alkyl group having from 1 to 6 carbon atoms.
* * * * *